United States Patent

[11] 3,588,502

[72] Inventor George B. Greenfield
 4855 Greenleaf Ave., Lincolnwood, Ill. 60646
[21] Appl. No. 16,191
[22] Filed Mar. 3, 1970
[45] Patented June 28, 1971

[54] RADIOGRAPHIC IMAGE SUBTRACTION TECHNIQUE
 5 Claims, 1 Drawing Fig.
[52] U.S. Cl. .................................................. 250/65R,
 96/44, 250/86, 356/156
[51] Int. Cl. ........................................................ G03b 41/16
[50] Field of Search ........................................... 96/44;
 356/156, 162, 164; 250/65, 86

[56] References Cited
 UNITED STATES PATENTS
 3,121,792 2/1964 Mittelstaedt ................. 250/65
 3,515,870 6/1970 Marquis ....................... 250/65

Primary Examiner—James W. Lawrence
Assistant Examiner—A. L. Birch
Attorney—Hume, Clement, Hume & Lee ABSTRACT: An X-ray image subtraction technique useful in angiography or the like involves producing first and second X-ray photographs of a preselected anatomical subject area, the second photograph being made subsequent to injecting an appropriate X-ray contrast media into the arteries, etc. that have been selected for study. The resultant X-ray photographs are then projected through different color filters to provide a composite X-ray image wherein common portions of the first and second photographs are presented in the sum color of the color filters and portions peculiar to the second photograph are presented in a color corresponding to a predetermined one of the color filters. This dual color composite image is projected into a color selective viewing system responsive to the one color but nonresponsive to the sum color, thereby to provide a viewable X-ray image of only those image portions peculiar to the second X-ray photograph.

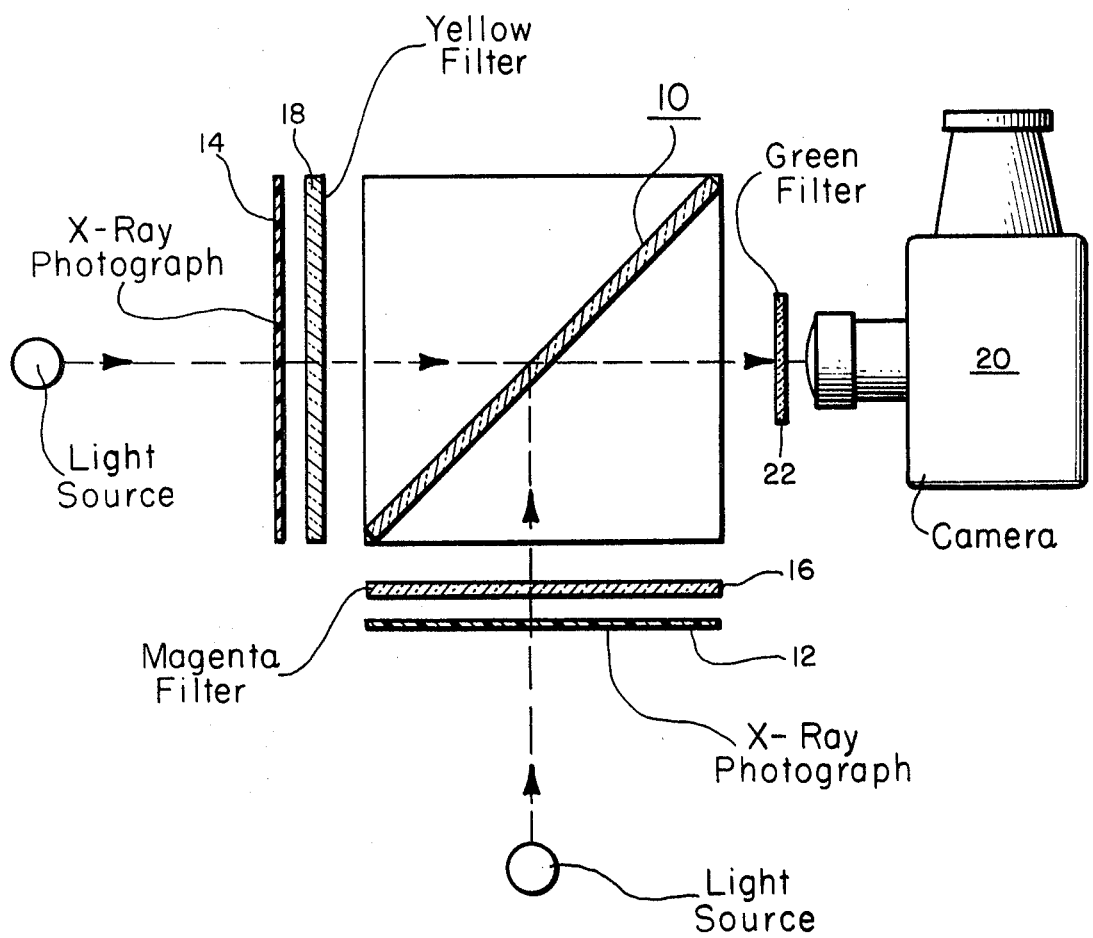

RADIOGRAPHIC IMAGE SUBTRACTION TECHNIQUE

DESCRIPTION OF THE INVENTION

Introduction

The present invention relates generally to radiography and, more particularly, is directed to new and improved methods for producing X-ray subtraction images such as are useful, for example, in angiography or the like.

BACKGROUND OF THE INVENTION

In order to obtain viewable X-ray images of certain nantomical areas such as arteries and the like, an X-ray contrast media is typically introduced into the arteries or other preselected portions of the subject area to be viewed so as to render these areas visible on the X-ray photograph. Frequently, however, adequate information is still not discernable from the X-ray photograph. Accordingly, various other methods have been employed to improve the information yield from such X-ray photographs.

One such method involves the taking of an X-ray photograph of the identical subject area both before and after introduction of the X-ray contrast media. One of the pair of photographs is then converted to a negative image or diapositive superimposed in registration with the remaining photograph, and a third composite image is made photographically. This technique results in a cancellation, or subtraction, of all of the picture elements common to the superimposed photographs, thereby leaving only the areas bearing the contrast media on the third photograph. The photographic reproduction of the diapositive image required in this method involves a laborious and time-consuming masking process.

Subtraction of before and after radiographs has also been accomplished by superimposing the images from each of a pair of television cameras on a single monitor, one of the images having been first reversed in polarity to create the necessary diapositive image. The expense and complexity of such a vidicon system is obvious.

Another technique for improving the viewability of a selected portion of a radiographic image is through use of a color subtraction technique wherein the common areas of the two radiographs appear in one color while the areas peculiar to only one of the radiographs appear in a second, different color. In this technique differentiation between the various portions of the image is strictly a function of color. Color photography is rather expensive, difficult, and time consuming and depends, for good results, on a practiced, subjective evaluation of color tones.

SUMMARY OF THE INVENTION

It is a primary object of the present invention to provide a new and improved method for producing X-ray subtraction images which obviates the disadvantages of the prior art methods noted above and which is technically simple and economical and avoids the necessity of preparing a diapositive image.

The method of the invention comprises the steps of producing first and second X-ray images of a predetermined subject area, the second image being made subsequent to introduction of an appropriate X-ray contrast media into preselected portions of the subject area. The resultant X-ray images are projected through different color filters to provide a composite of the first and second X-ray images when common portions of the two images are present in the sum color of the color filters and portions peculiar to the second X-ray image are presented in one color corresponding to that of one of the color filters. The composite image is then projected into a color selective viewing system responsive to the one color but nonresponsive to the sum color to produce a viewable X-ray image of only the image portions peculiar to the second X-ray image. The color selective viewing system may, for example, be a conventional camera provided with ordinary orthochromatic film which is inherently nonsensitive to the sum color while the first and second X-ray images from which the composite is formed may likewise be ordinary black and white X-ray photographs.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings, the single FIGURE of which illustrates an exemplary system for practicing the method of the present invention.

DESCRIPTION OF THE PREFERRED EMBODIMENT(S)

Referring now to the single FIGURE of the drawings, there is illustrated one form of apparatus for practicing the method of the present invention. Specifically, the apparatus comprises a conventional beamsplitting mirror assembly 10 positioned at an angle of 45° between a pair of light sources denoted schematically in the drawing by the respective arrows emanating from each labeled light source. In practice, the individual light sources may be carried within conventional view boxes which are individually supported for movement along respective guide tracks to permit a selective positioning of the view boxes relative to the beamsplitting mirror 10.

A pair of X-ray images of a predetermined subject area made respectively before and after introduction of an X-ray contrast media into preselected portions of the subject area are positioned intermediate the respective light sources and the beamsplitting mirror 10. In the present example, the X-ray images are conventional black and white X-ray photographs 12 and 14 which may be positioned in overlying relation to the respective view boxes (not shown). The X-ray photographs 12 and 14 may, for instance, represent identical views of a human skull made respectively before and after certain blood vessels of the brain have been opacified by injection of a suitable X-ray contrast media. The techniques for making such X-ray photographs are well known to the art and therefore will not be considered in detail herein.

In accordance with the present invention, it is required that the light transmitted by each X-ray image 12 and 14 to the beamsplitting mirror 10 be of a different color. To this end, different color filters 16 and 18 are inserted in the optical paths between the photographs 12 and 14 and the mirror 10.

In the present example, the filters 16 and 18 are magenta and yellow, respectively, although it will become apparent to those skilled in the art that various other filter combinations as well as light sources of various color content may be employed consistent with the method of the present invention.

A composite of the X-ray photographs 12 and 14 is directed by the beamsplitting mirror 10 towards the lens of a conventional camera 20. The composite image of the X-ray photographs 12 and 14 is visible through the viewfinder of the camera 20 and, at this time, the positioning of the viewboxes is adjusted to assure perfect registration of the X-ray photographs and each light source is also adjusted to assure that each X-ray image is projected with an equal and suitable intensity. It will be understood that the foregoing adjustments may be made exclusively by subjective evaluation of the system operator or that various automatic means may be employed as an aid in forming the composite image.

At any rate, it will now be recognized that those light transmitting areas common to the photographs 12 and 14 will appear in the composite image in a color corresponding to the sum of that produced by the filters 16 and 18, in this instance, red. On the other hand, those areas peculiar to one or the other of the X-ray photographs appear in the composite in a color corresponding to that of its associated filter. Assuming that the photograph 14 is the one on which the image of the contrast media appears, the image of the contrast media will appear in yellow light in the composite image formed at the lens of the camera 20.

In accordance with the present invention, the film of the camera 20 is either nonsensitive to the sum color of the composite image or, alternatively, a filter 22 may be positioned over the camera lens to absorb the sum color while concurrently transmitting the single component color which is effective to sensitize the film of the camera 20. Thus, the photograph produced by the camera 20 depicts substantially only those portions of the X-ray subject area containing the contrast media, i.e. the opacified blood vessels within the patient's brain. The myriad lines produced by complex structure of the skull, frequently confused with small vessel shadows, are eliminated and the contrast of the vessels under consideration is markedly enhanced by the present subtraction technique, all without production of a diapositive image.

In the present instance, the camera of 20 is provided with conventional orthochromatic film which is inherently nonsensitive to red light but which is sensitive to the yellow light transmitted through the X-ray photograph 14. As a further, although redundant, barrier to the red light, the green filter 22 may be placed in advance of the lens of the camera 20.

Although the X-ray subtraction technique of the present invention has been described with respect to neuroradiology, it will be recognized that the principles are equally applicable to thoracic and abdominal angiography, as well as any other anatomical or, for that matter, industrial, X-ray applications wherein it is desired to obtain an X-ray subtraction image. Furthermore, it will be recognized that various permutations and combinations of filters and light sources other than those specifically described herein may be used consistent with the methods of the present invention. Additionally, a wide variety of projection systems known to the prior art may be employed in combining the individual X-ray images into the required composite and in this regard the individual X-ray images need not be photographs but may be taken directly from the display screens of X-ray image intensifiers or the like.

While particular embodiments of the present invention have been shown and described, it is apparent that various changes and modifications may be made, and it is therefore intended in the following claims to cover all such modifications and changes as may fall within the true spirit and scope of this invention.

I claim:

1. The method of producing an X-ray subtraction image comprising the steps of:
   producing a first X-ray image of a predetermined subject area;
   producing a second X-ray image of said subject area subsequent to introducing an X-ray contrast media into preselected portions of said subject area;
   projecting said first and second X-ray images through different color filters to provide a composite of said first and second X-ray images wherein common portions of said first and second images are presented in the sum color of said color filters portions and portions peculiar to said second X-ray image area are presented in one color corresponding to that of a predetermined one of said color filters; and
   projecting said composite image into a color selective viewing system responsive to said one color but nonresponsive to said sum color to produce a viewable X-ray image of substantially only said image portions peculiar to said second X-ray image.

2. The method of claim 1 in which the producing of said first and second X-ray images comprises the producing of first and second black and white X-ray image photographs.

3. The method of claim 2 in which the projecting of said composite image into a color selective viewing system includes the step of projecting said composite image onto a black and white X-ray photographic film that is substantially nonsensitive to said sum color, but sensitive to said one color for producing a black and white X-ray photograph of only said image portions peculiar to said second X-ray image.

4. The method of claim 3 in which said subject area is a preselected portion of the human anatomy and in which said contrast media is a fluid injected into the cardiovascular system of said human.

5. The method of claim 3 in which the projecting of said composite image into said color selective viewing system includes the step of projecting said composite image through a color filter of a type that absorbs light rays of said sum color.